(12) United States Patent  
Eckhardt

(10) Patent No.: US 9,229,200 B2  
(45) Date of Patent: Jan. 5, 2016

(54) PANORAMIC OPTICAL SYSTEMS

(71) Applicant: EyeSee360, Inc., Pittsburgh, PA (US)

(72) Inventor: Stephen K. Eckhardt, White Bear Lake, MN (US)

(73) Assignee: EyeSee360, Inc., Pittsburgh, PA (US)

( * ) Notice: Subject to any disclaimer, the term of this patent is extended or adjusted under 35 U.S.C. 154(b) by 0 days.

(21) Appl. No.: 13/737,296

(22) Filed: Jan. 9, 2013

(65) Prior Publication Data

US 2014/0022649 A1   Jan. 23, 2014

Related U.S. Application Data

(60) Provisional application No. 61/584,566, filed on Jan. 9, 2012.

(51) Int. Cl.
*G02B 17/00* (2006.01)
*G02B 13/06* (2006.01)
*G02B 17/08* (2006.01)

(52) U.S. Cl.
CPC ............ *G02B 13/06* (2013.01); *G02B 17/08* (2013.01); *G02B 17/086* (2013.01); *G02B 17/0852* (2013.01)

(58) Field of Classification Search
CPC ..................................................... G02B 17/08
USPC ........................................................ 359/728
See application file for complete search history.

(56) References Cited

U.S. PATENT DOCUMENTS

| | | | |
|---|---|---|---|
| 1,616,279 | A | 2/1927 | Parodi |
| 2,244,235 | A | 6/1941 | Ayres |
| 2,299,682 | A | 10/1942 | Conant |
| 2,371,495 | A | 3/1945 | Benford |
| 2,430,595 | A | 11/1947 | Young |
| 2,638,033 | A | 5/1953 | Buchele et al. |
| 5,185,667 | A | 2/1993 | Zimmermann |
| 5,627,675 | A | 5/1997 | Davis et al. |
| 5,790,181 | A | 8/1998 | Chahl et al. |
| 5,920,376 | A | 7/1999 | Bruckstein et al. |
| 6,304,285 | B1 | 10/2001 | Geng |
| 6,412,961 | B1 | 7/2002 | Hicks |
| 6,459,451 | B2 | 10/2002 | Driscoll, Jr. et al. |
| 6,597,520 | B2 | 7/2003 | Wallerstein et al. |
| 6,856,472 | B2 | 2/2005 | Herman et al. |
| 7,058,239 | B2 | 6/2006 | Singh et al. |
| 7,242,425 | B2 | 7/2007 | Driscoll, Jr. et al. |
| 2001/0010555 | A1 | 8/2001 | Driscoll, Jr. |
| 2005/0111084 | A1* | 5/2005 | Mandella ........................ 359/364 |

FOREIGN PATENT DOCUMENTS

FR       2942048 A1     8/2010

* cited by examiner

*Primary Examiner* — James Jones
(74) *Attorney, Agent, or Firm* — Alan G. Towner, Esq.; Pietragallo Gordon Alfano Bosick & Raspanti, LLP

(57) ABSTRACT

Panoramic optical systems are disclosed comprising an ellipsoidal mirror and a lens system that reduces astigmatism. The lens systems are capable of operating at fast speeds. Simple and highly manufacturable lens systems are provided for capturing and/or projecting high quality 360-degree panoramic scenes.

18 Claims, 4 Drawing Sheets

PANORAMIC OPTICAL SYSTEMS

CROSS-REFERENCE TO RELATED APPLICATION

This application claims the benefit of U.S. Provisional Patent Application Ser. No. 61/584,566 filed Jan. 9, 2012, which is incorporated herein by reference.

FIELD OF THE INVENTION

The present invention relates to panoramic optical systems, and in particular, it relates to catadioptric panoramic optical systems comprising a mirror and multiple transmissive elements.

BACKGROUND INFORMATION

Many rotationally symmetric lenses have been described over the years, and most of them are capable of imaging an azimuthal field of 360° about the axis of rotation, also called the optical axis. What distinguishes panoramic lenses is that their field of view is not measured from 0° at the optical axis to their maximum field, rather their field of view is measured with respect to a plane perpendicular to the optical axis. This plane is often referred to as the horizontal plane. For example, for a panoramic lens, the field of view may be referred to as +5°/−20°, which means that the picture includes up to five degrees above the horizontal and twenty degrees below.

Means of obtaining panoramic views such as use of multiple cameras or scanning a single camera have been proposed. However, a major problem with multiple cameras is stitching the images together to form a panorama. Carefully scanning a single camera can alleviate this difficulty, but accurately moving a camera introduces an additional set of difficulties.

Optical systems may be divided into three categories: dioptric, catoptric and catadioptric. The first of these categories, dioptric, contains all optical systems that have only transmissive elements. Similarly, catoptric optical systems have only reflective elements. Catadioptric optical systems have both transmissive and reflective elements, and may be divided into two subcategories. One of these subcategories includes all optical systems that have within them a single element that both reflects and transmits light, while the other is restricted to elements that either reflect or transmit, but not both. The latter subcategory includes optical systems that have mirrors that transmit light either around their periphery or through a hole, as long as that light is not refracted by the mirror substrate.

Dioptric wide angle lenses, such as fisheye lenses, have been known to achieve larger than hemispherical fields of view, with half field angles up to 140°, measured from the optical axis. Such lenses are frequently described by their full field angle, so a lens with the half field angle of 140° would be called a 280° fisheye. As a panoramic lens, it would be described as a +90°/−50° lens. However, fisheye lenses often have significant image compression (distortion) at the edge of the field of view, resulting in decreased resolution in the portion of the field near the horizontal plane. U.S. Pat. No. 5,185,667 to Zimmerman describes the use of a fisheye lens as a panoramic lens.

Catoptric optical systems have also been proposed as panoramic lenses. For example, U.S. Pat. No. 5,920,376 to Bruckstein et al. describes cameras that are purely catoptric, consisting only of one or more mirrors and a pinhole camera arrangement. A significant problem with this type of system is that a pinhole does not allow much light to get to the image. The pinhole is generally required to reduce aberrations to an acceptable level. Another way to express this problem is that catoptric panoramic lenses are generally restricted to large F-numbers or small numerical apertures by their aberrations.

U.S. Pat. No. 1,616,279 to Parodi and U.S. Pat. No. 2,638,033 to Buchele describe catadioptric panoramic optical systems. Although there are certain advantages to such designs, an overriding difficulty is the difficulty and complexity of fabricating the elements.

Catadioptric panoramic optical systems with only reflecting or transmitting elements are known. Multiple-catadioptric systems may be capable of high performance, but suffer the difficulty of aligning the mirrors and keeping them in alignment. One example of a complex mirror alignment is disclosed in U.S. Pat. No. 5,627,675 to Davis et al. Although blur sizes of less than 10 microns at F/1.5 are shown, the optical arrangement is extremely complex.

Single mirror catadioptric panoramic optical systems have been described in various patents. U.S. Pat. No. 2,244,235 to Ayres proposes a spherical mirror, with the possibility of corrected for aberrations. U.S. Pat. No. 2,299,682 to Conant discloses parabolic mirrors and others of modified conical curvature, e.g., conical and spherical forms. U.S. Pat. No. 2,371,495 to Benford deviates from simple quadric forms and prescribes a mirror that is shaped to create uniform illumination versus angle.

Aberrations, as mentioned in the Ayres U.S. Pat. No. 2,244,235 patent cited above or U.S. Pat. No. 2,430,595 to Young, are important factors in designing a panoramic optical system. They may be categorized as chromatic or monochromatic aberrations. Chromatic aberrations cause images of points to be spread out according to the wavelength of light. Such aberrations can be eliminated by using only mirrors or may be reduced by using achromatic lenses.

Monochromatic aberrations are typically divided into primary and higher order aberrations. Primary aberrations include spherical aberration, which introduces a blur to the image that is constant across the field of view. Coma and astigmatism blur the image with a magnitude that varies linearly and quadratically with field angle, respectively. Field curvature causes the best image not to lie on a plane, so that an image formed on a flat piece of film or a flat array detector is blurred. Distortion does not blur the image, but causes a magnification that varies as the cube of the field angle, so that the image of a square has curved sides.

Such aberrations adversely affect the quality of the images. The aberrations that are most significant in panoramic lenses are astigmatism and distortion because the field angle is so large. Because it does not blur the image, distortion of up to roughly ten or twenty percent is often tolerable. This leaves astigmatism as the most important aberration in panoramic lenses.

Several ways to reduce astigmatism to an acceptable level have been proposed. One way is to use an optical system with several mirrors, such as described in the Davis et al. U.S. Pat. No. 5,627,675 patent. Another way is to use a very slow (high F/number) optical system, such as the pinhole camera mentioned in the Bruckstein et al. U.S. Pat. No. 5,920,376 patent. The former method is impractical to manufacture for commercial purposes due to its complexity, and the latter can be impractical for photography because it requires the scene to be brightly illuminated. Another approach is described in U.S. Pat. No. 7,242,425 to Driscoll, Jr. et al., which is incorporated herein by reference. Driscoll, Jr. et al. U.S. Pat. No. 7,242,425 proposes the use of a parabolic mirror with an astigmatism correction lens.

Specially shaped mirrors for catadioptric panoramic lenses have been proposed with a variety of design rationales. U.S. Pat. No 2,371,495 to Benford proposed a shape that corrects for cosine falloff of illumination. U.S. Pat. No. 6,304,285 to Geng proposes a hyperbolic mirror for single virtual viewpoint. U.S. Pat. No. 6,412,961 to Hicks suggests a mirror form that maps a distance in object space to a distance on the image. U.S. Pat. No. 6,856,472 to Herman discloses another type of mirror design. Such designs deal primarily with distortion, which may be described generally as the mapping of angles or distances in object space to angles or distances in image space. U.S. Pat. No. 2,244,235 to Ayres mentions that the shape of the surfaces and shells of spherical reflectors may be corrected for aberration, but provides no description of the particular type of aberration, or how to correct it.

SUMMARY OF THE INVENTION

The present invention provides periscopic lens systems with a single mirror designed to minimize astigmatism. Simple, highly manufacturable lens systems are provided for capturing and/or projecting a 360-degree panoramic scene that requires only a single mirror. Despite their simplicity, the lens systems are designed to be used at fast speeds, e.g., faster than F/10. To achieve this combination of simplicity and speed, an ellipsoidal mirror is used to minimize astigmatism in combination with a dioptric lens group that counterbalances the aberrations introduced by the ellipsoidal mirror.

An aspect of the present invention is to provide a panoramic optical system comprising an ellipsoidal mirror, and an astigmatism reducing lens system comprising a series of lenses arranged to transmit images from the ellipsoidal mirror, wherein the lens system has an F/number faster than F/10 and reduces astigmatism to less than ±500 microns, for example, ±200 microns.

This and other aspects of the present invention will be more apparent from the following description.

DETAILED DESCRIPTION

The panoramic optical system of the present invention comprises an ellipsoidal mirror and multiple dioptric lens elements. The ellipsoidal mirror is designed to minimize astigmatism and the dioptric lens elements counterbalance aberrations introduced by the mirror.

Figure 1:
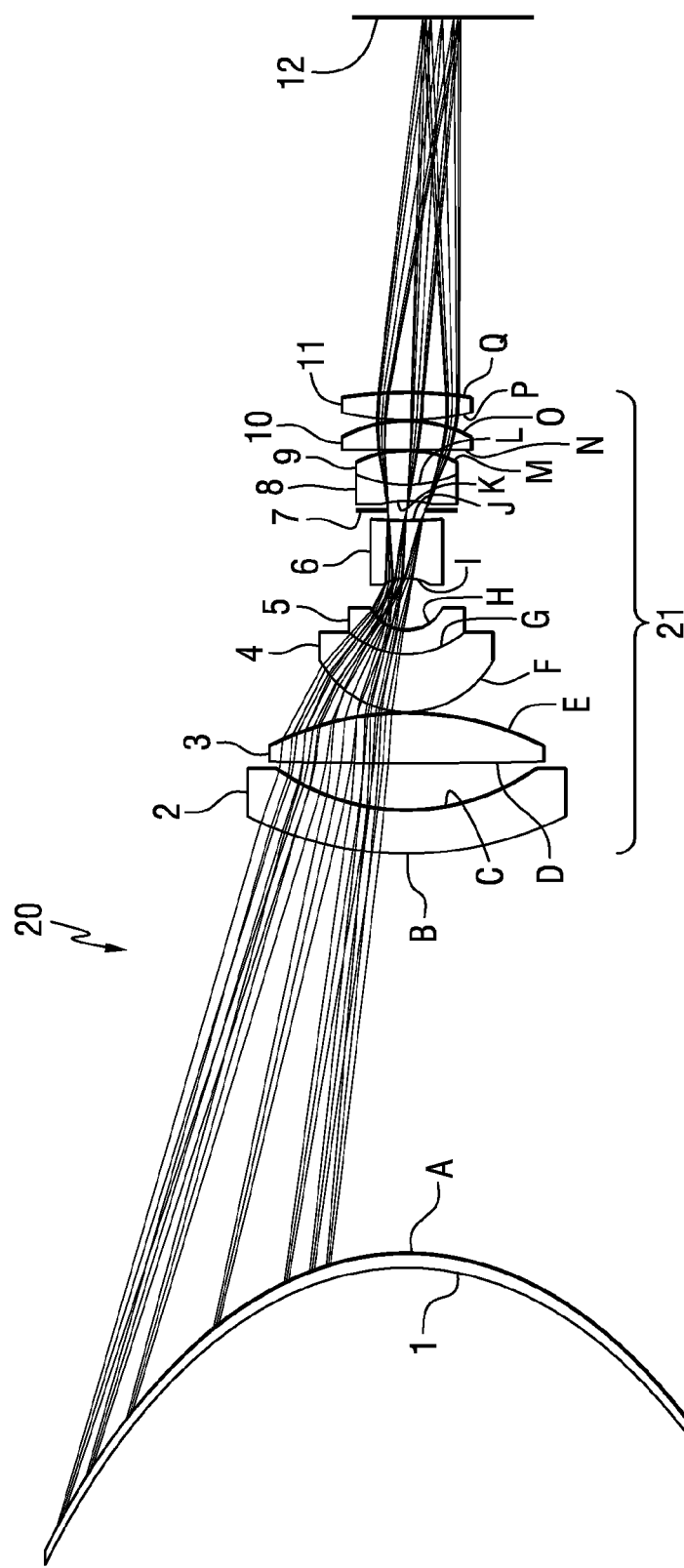
FIG. 1 is a partially schematic cross-sectional view of a panoramic optical system including an ellipsoidal mirror and a series of lenses in accordance with an embodiment of the invention.

Referring to FIG. 1, a panoramic optical system 20 in accordance with an embodiment of the present invention includes a single ellipsoidal mirror 1 and a dioptric group or lens system 21. The mirror 1 is elliptical in form to minimize astigmatism, compared to spherical, parabolic or hyperbolic mirrors that introduce significantly more astigmatism.

The dioptric group 21 includes a multiplicity of dioptric elements 2-6 and 8-11 and an aperture stop 7. Light enters the dioptric group 21 after reflecting from the mirror 1. As it passes through the dioptric group 21 it passes through the aperture stop 7, which limits the F/number of the beam.

The aperture stop 7 may be made of a single part, such as a sheet of metal, for example, or may be adjustable. One example of an adjustable aperture stop is an iris diaphragm, but other adjustable apertures known in the art may be used.

After passing through the dioptric group 21, the light comes to a focus at the image plane 12. A conventional imaging device, such as film or an electronic detector, for example a CCD or CMOS array, may be placed in the vicinity of the image plane to receive the image. Alternatively, the panoramic lens may be used as a projection lens, in which case the film to be projected or an electronic imaging device for imprinting an image on a beam of light, such as an LCD or a micromirror device, for example a DLP, available from Texas Instruments, Inc. of Richardson, Tex., USA, may be placed in the vicinity of the image plane. Light from a light source shined through or reflected from the imaging device could then be projected onto a screen, which may be cylindrical, spherical or some other shape.

The optical properties of the panoramic mirror and lens system of FIG. 1 are described in Table 1.

TABLE 1

| Element No./ Surface | Curvature | Thickness | Glass | Semi-Diameter | Conic Constant |
|---|---|---|---|---|---|
| (Object) | 0.000000 | 1.00E+10 | | 0.00 | |
| 1/A | 0.028021 | −55.336 | MIRROR | 50.00 | −0.742 |
| 2/B | −0.020143 | −6.000 | S-TIH10 | 22.00 | |
| 2/C | −0.032501 | −6.523 | | 18.00 | |
| 3/D | −0.001116 | −7.000 | S-BSM16 | 19.00 | |
| 3/E | 0.024014 | −0.100 | | 19.00 | |
| 4/F | −0.073438 | −8.000 | S-TIH10 | 12.00 | |
| 4/G | −0.083500 | −3.300 | | 8.00 | |
| 5/H | −0.180784 | −7.223 | S-LAL14 | 5.00 | |
| 6/I | 0.151028 | −8.000 | S-LAL14 | 3.30 | |
| 6/J | −0.014538 | −1.363 | | 5.00 | |
| 7 | 0.000000 | −1.363 | | 2.58 | |
| 8/K | 0.067420 | −2.200 | S-TIH10 | 3.50 | |
| 8/L | −0.058102 | −4.800 | | 7.00 | |
| 9/M | 0.064329 | −0.100 | S-LAL14 | 7.00 | |
| 10/N | 0.000598 | −4.000 | S-BSM16 | 7.69 | |
| 10/O | 0.053090 | −0.100 | | 9.00 | |
| 11/P | −0.025641 | −3.800 | S-BSL7 | 9.00 | |
| 11/Q | 0.016432 | −52.000 | | 9.00 | |
| 12 (Image) | 0.000000 | 0.000 | | 7.51 | |

In Table 1, the first column lists the element numbers shown in FIG. 1, as well as the mirror surface and lens element surfaces, listed as A-Q. The object and the image are also listed in Table 1. The second column in Table 1 is the surface curvature, which is the reciprocal of the radius of curvature. In the third column, the numbers represent the distance to the next surface. Glass types displayed in the fourth column are commercially available from Ohara Corporation, Rancho Santa Margarita, Calif. All of the elements in this lens are rotationally symmetric, so the fifth column lists the distance from the optical axis to the periphery of the element. Finally, the number in the last column represents the conic constant of the mirror.

A conic surface is described by the following equation:

$$z = \frac{cy^2}{1 + \sqrt{1 - (1+k)c^2 y^2}}$$

where z is the distance from a plane tangent to the surface at its intersection with the optical axis, c is the curvature of the surface (the reciprocal of its radius of curvature), y is the distance from the optical axis to the point at which z is to be calculated and k is the conic constant. A conic constant may be used by lens design programs, such as Zemax, commercially available from Radiant Zemax LLC, Bellevue, Wash., to describe the eccentricity of a conic surface of revolution.

Although the conic constant shown in Table 1 is −0.742, other conic constants may be used. A conic constant equal to 0 represents a sphere, and a conic constant equal to −1 represents a parabola with values between these limits representing an ellipse. To minimize astigmatism, an elliptical conic constant between −0.01 and −0.99 may be used in accordance with the present invention, typically between −0.3 and −0.9. In certain embodiments, the conic constant is between −0.6 and −0.85. It is also possible to use an ellipsoidal mirror with aspheric terms in addition to the conic constant. A user of the Zemax program would describe this surface as an even asphere or an odd asphere or a Q-type asphere. Such a mirror may be used in accordance with the present invention to reduce astigmatism. A feature of the ellipsoidal mirrors according to this invention is that the shape generally lies between that of a sphere and a parabola with the same curvature, at least within the used area.

The panoramic field of view in this embodiment may be at least ±50°, as measured from a plane perpendicular to the optical axis. In other embodiments, the field of view may be symmetric about the horizontal plane, for example, ±30° or ±40°, or asymmetric, for example +50°/−70° or +60°/−40°. The field of view can be chosen to be smaller, to maximize the resolution for a given number of pixels on the detector, or larger, to maximize the amount of space observed.

Figure 2:
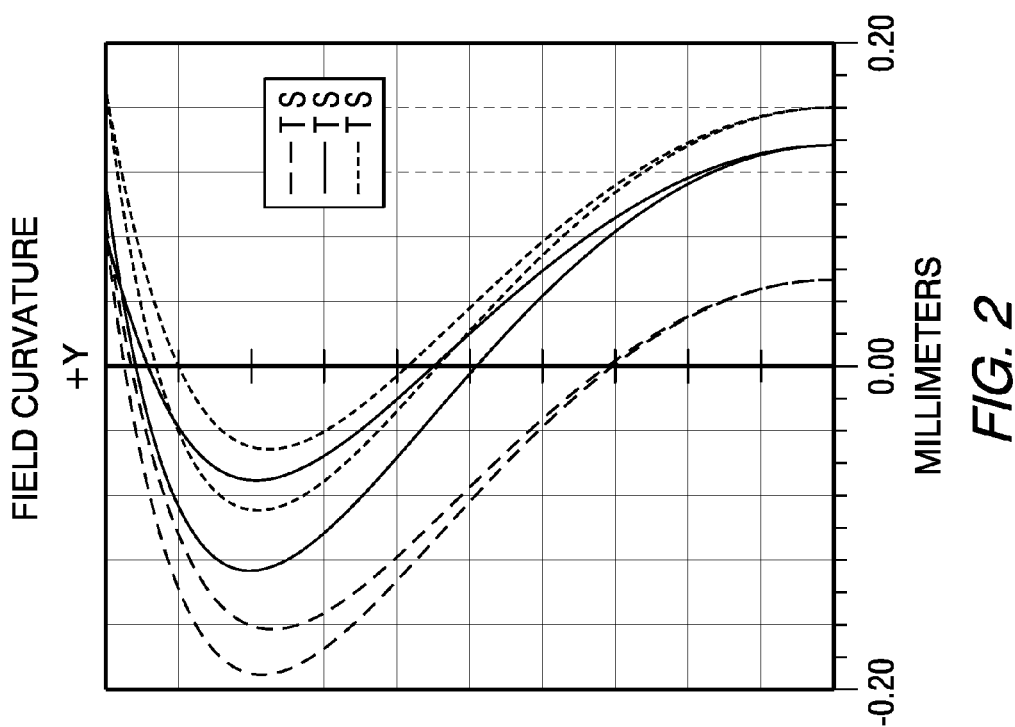
FIG. 2 is an astigmatism plot for the panoramic optical system of FIG. 1.

FIG. 2 is a plot of the parabasal astigmatic field curves for the embodiment shown in FIG. 1 and described in Table 1. These curves show that the astigmatism has been reduced to less than ±200 microns, which is very well controlled for many applications. In this plot, astigmatism is calculated as the differences between the sagittal and tangential foci, based on tracing Coddington rays. This calculation is described in optics texts, for example, Rudolf Kingslake, "Lens Design Fundamentals", Academic Press, New York, 1978. It can be measured by using an industry standard target such as the US Air Force 1951 three-bar target. Such targets may be purchased from, for example, Edmund Optics, Barrington, N.J.

Figure 3:
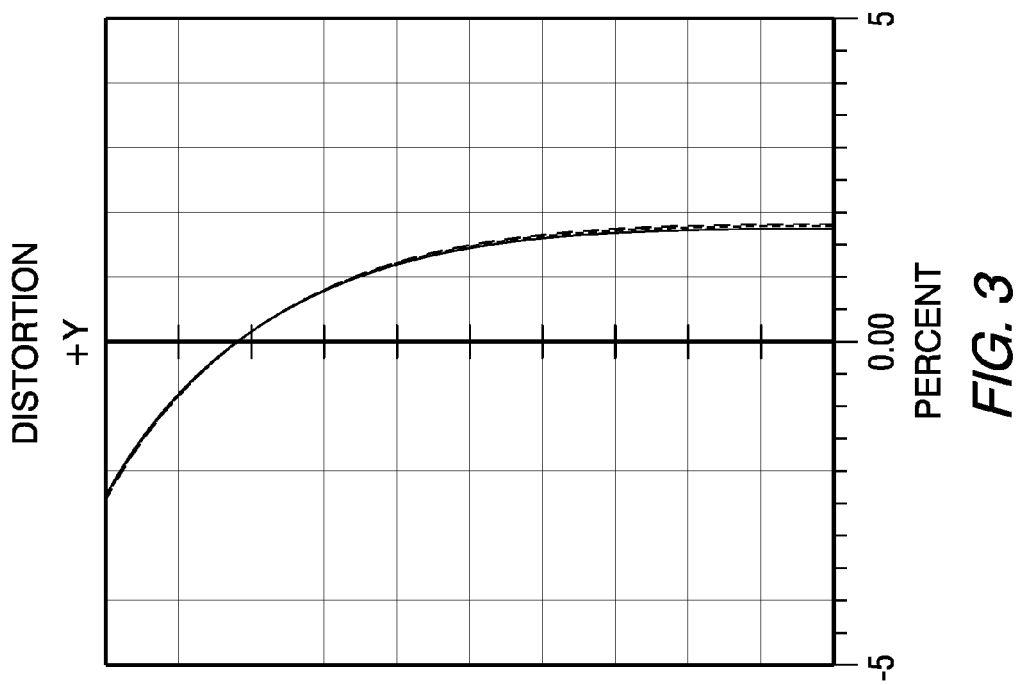
FIG. 3 is a distortion plot for the panoramic optical system of FIG. 1.

FIG. 3 shows the calibrated F-theta distortion for the embodiment shown in FIG. 1 and described in Table 1. F-theta distortion is based on the assumption that an angle in object space will be mapped to a distance on the image. It is measured as the distance between the actual image point and one calculated based on constant magnification and expressed as a percentage difference between the two distances from the center of the image. Distortion of less than 5% is sufficiently well controlled to be hard to notice, and certainly small enough to enable electronic correction.

Figure 4:
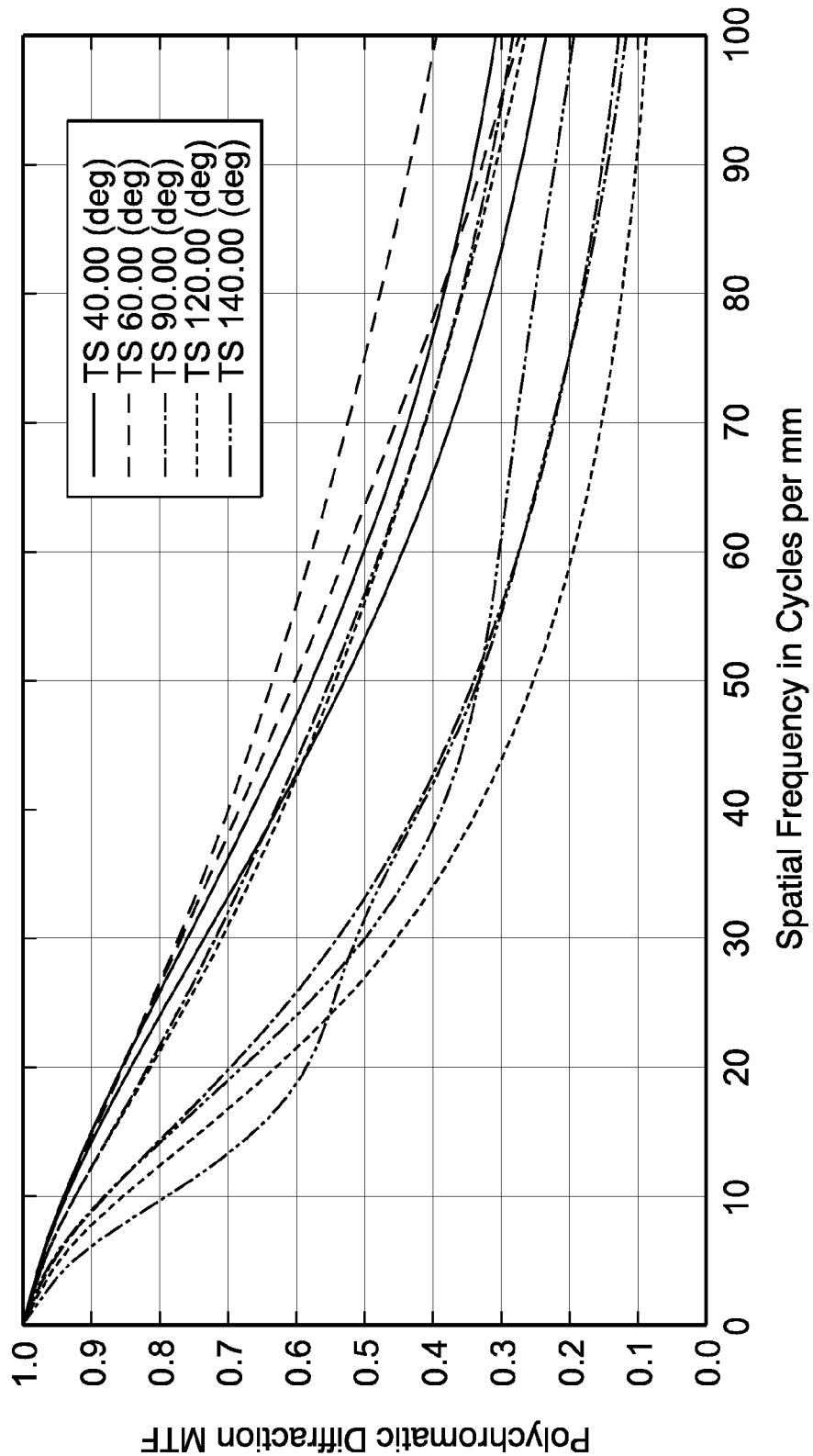
FIG. 4 is a polychromatic diffraction modulation transfer function (MTF) plot for the panoramic optical system of FIG. 1.

FIG. 4 plots the MTF of the embodiment shown in FIG. 1 and described in Table 1. Aberrations in this embodiment are small enough for use with a pixelated detector with pixels of less than 10 micron pitch.

The embodiment shown in FIG. 1 and described in Table 1 may be useful as fast as F/5.6. In other embodiments, the F/number may be as fast as F/10, or F/8, or F/4 or F/2.8. The F/number values are determined by standard methods known in the art in which the focal length of a lens is divided by the entrance pupil diameter. Lower F/numbers correspond to lenses that allow more light to the image plane, so lower F/numbers are more desirable for situations with dimmer lighting or when faster shutter speeds are required to stop motion.

Figure 5:
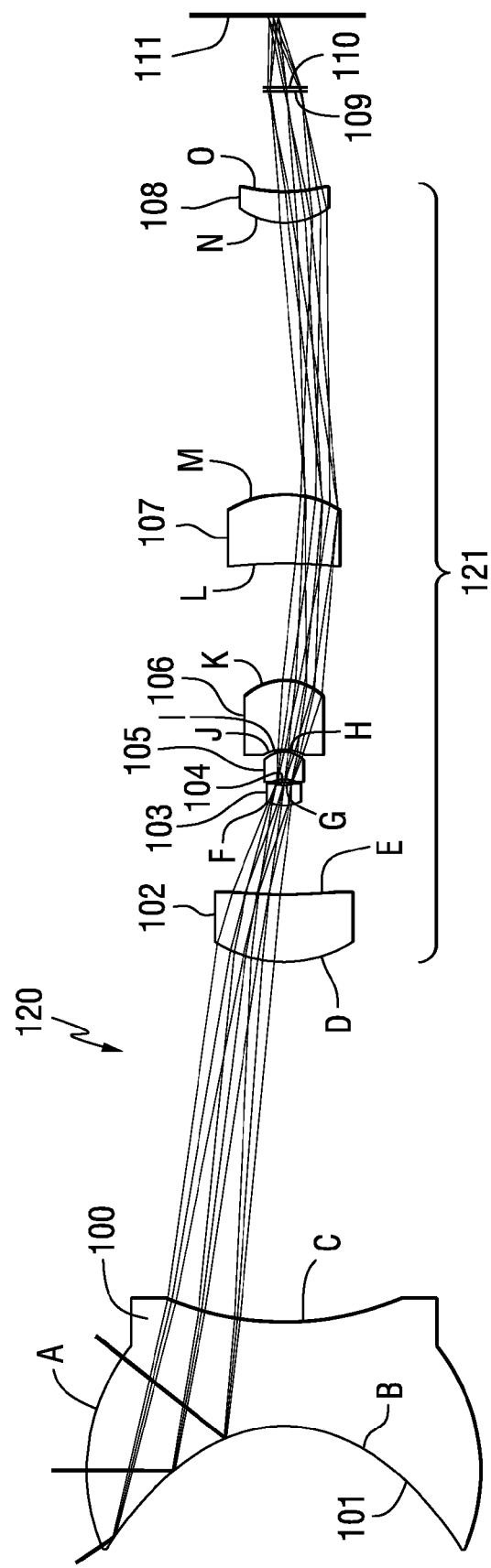
FIG. 5 is a partially schematic cross-sectional view of a panoramic optical system including an ellipsoidal mirror and a series of lenses in accordance with another embodiment of the invention.

FIG. 5 illustrates another panoramic optical system 120 in accordance with an embodiment of the present invention, which is further described in Table 2. The first optical element 100, referred to as the ball in Table 2, is a catadioptric mirror with an outer surface A, a mirror 101 with a reflective surface B, and an exit surface C. The outer surface A may be a sphere, as described in Table 2, or it may be aspheric. The mirror surface B is, according to this invention, elliptical in cross-section. The exit surface C may be spherical, as shown in this example or it may be aspherical. All of the other surfaces D-O in the embodiment shown in FIG. 5 and described in Table 2 are dioptric, some being spherical and others aspherical. The system 120 includes a lens system 121 comprising a series of lenses 102, 103 and 105-108, having the surfaces D-O labeled in FIG. 5 and listed in Table 2. This panoramic lens is designed to operate as fast as F/2.8 but could be modified for other F/numbers.

TABLE 2

| Element No./Surface | Comment | Curvature | Thickness | Glass | Semi-Diameter | Conic Constant | A4 | A6 |
|---|---|---|---|---|---|---|---|---|
| | Object | 0.00000 | 1.00E+10 | | 0.00 | | | |
| 100/A | Ball Outer Surface | 0.08774 | 8.815 | PMMA | 10.51 | | | |
| 101/B | Mirror | 0.12257 | −6.000 | MIRROR | 9.99 | −0.7870 | | |
| 100/C | Ball Exit Surface | −0.05761 | −20.840 | | 6.81 | | | |
| 102/D | 1st Lens | −0.12697 | −3.897 | PMMA | 3.98 | | −1.5982E−04 | −8.6866E−06 |
| 102/E | | −0.03374 | −5.147 | | 3.10 | | | |
| 103/F | 2nd Lens | −0.54701 | −1.182 | PMMA | 1.00 | | 4.1240E−02 | |
| 103/G | | −0.55179 | −0.091 | | 0.57 | | | |
| 104 | Stop | 0.00000 | −0.240 | | 0.45 | | | |
| 105/H | 3rd Lens | 0.65339 | −1.601 | PMMA | 0.61 | | | |
| 105/I | | 0.64825 | −0.132 | | 1.14 | | −2.5798E−02 | |
| 106/J | 4th Lens | 0.40017 | −3.993 | PMMA | 1.20 | | | |
| 106/K | | 0.31802 | −6.759 | | 2.28 | | −1.1018E−04 | −3.7457E−04 |
| 107/L | 5th Lens | 0.03472 | −4.001 | PMMA | 2.93 | | −2.3269E−04 | 2.9449E−05 |

TABLE 2-continued

| Element No./Surface | Comment | Curvature | Thickness | Glass | Semi-Diameter | Conic Constant | A4 | A6 |
|---|---|---|---|---|---|---|---|---|
| 107/M | | 0.16259 | −15.707 | | 3.25 | | | |
| 108/N | 6$^{th}$ Lens | −0.22803 | −1.771 | PMMA | 2.57 | | −1.7472E−04 | −2.0048E−05 |
| 108/O | | −0.10587 | −6.000 | | 2.29 | | | |
| 109 | Camera Pupil | 0.00000 | 0.100 | | 1.13 | | | |
| 110 | Dummy Camera Lens | 0.00000 | −4.200 | | 1.14 | | | |
| 111 | Image | 0.00000 | 0.000 | | 0.93 | | | |

The aspheric surfaces in Table 2 are described by the following equation, $$z = \frac{cy^2}{1 + \sqrt{1 - (1+k)c^2 y^2}} + A_4 y^4 + A_6 y^6$$

where z is the axial distance from the tangent plane to the surface, c is the curvature of the surface, y is the distance from the axis to the point on the surface, k is the conic constant and A4 and A6 are aspheric coefficients.

Whereas particular embodiments of this invention have been described above for purposes of illustration, it will be evident to those skilled in the art that numerous variations of the details of the present invention may be made without departing from the invention as defined in the appended claims.

What is claimed is:

1. A panoramic optical system comprising:
   an ellipsoidal mirror; and
   an astigmatism reducing lens system comprising a series of lenses arranged to transmit images from the ellipsoidal mirror, wherein the lens system has an F/number faster than F/10 and reduces astigmatism to less than ±500 microns, and wherein the panoramic optical system has a panoramic field of view ranging from −30° or less to +30° or more with respect to a plane perpendicular to an optical axis of the system.

2. The panoramic optical system of claim 1, wherein the lens system reduces astigmatism to less than ±200 microns.

3. The panoramic optical system of claim 1, wherein the ellipsoidal mirror comprises a conic constant of from −0.3 to −0.9.

4. The panoramic optical system of claim 1, wherein the ellipsoidal mirror comprises a conic constant of from −0.6 to −0.85.

5. The panoramic optical system of claim 1, wherein the ellipsoidal mirror is catadioptric.

6. The panoramic optical system of claim 1, wherein the lens system comprises at least 5 of the lenses.

7. The panoramic optical system of claim 1, wherein the lens system comprises less than 10 of the lenses.

8. The panoramic optical system of claim 1, wherein the lenses are rotationally symmetric.

9. The panoramic optical system of claim 1, wherein the panoramic field of view ranges from −40° or less to +40° or more with respect to the plane perpendicular to the optical axis of the system.

10. The panoramic optical system of claim 1, wherein the panoramic field of view ranges from −50° or less to +50° or more with respect to the plane perpendicular to the optical axis of the system.

11. The panoramic optical system of claim 1, wherein the F/number is faster than F/8.

12. The panoramic optical system of claim 1, wherein the F/number is faster than F/6.

13. The panoramic optical system of claim 1, having an F-theta distortion of less than 15 percent.

14. The panoramic optical system of claim 1, having an F-theta distortion of less than 5 percent.

15. The panoramic optical system of claim 1, wherein the optical system is afocal.

16. The panoramic optical system of claim 1, further comprising a detector for detecting an image after passing through the lens system.

17. The panoramic optical system of claim 1, further comprising a projector for projecting an image after passing through the lens system.

18. A panoramic optical system comprising:
   an ellipsoidal mirror comprising a convex reflective surface; and
   an astigmatism reducing lens system comprising a series of lenses arranged to transmit images from the ellipsoidal mirror, wherein the lens system has an F/number faster than F/10 and reduces astigmatism to less than ±500 microns, and wherein the panoramic optical system has a panoramic field of view ranging from −30° or less to +30° or more with respect to a plane perpendicular to an optical axis of the system.

* * * * *